(12) United States Patent
Mimura et al.

(10) Patent No.: US 10,836,254 B2
(45) Date of Patent: Nov. 17, 2020

(54) VEHICLE CONTROL SYSTEM, VEHICLE CONTROL METHOD, AND VEHICLE CONTROL PROGRAM

(71) Applicant: HONDA MOTOR CO., LTD., Tokyo (JP)

(72) Inventors: Yoshitaka Mimura, Wako (JP); Masahiko Asakura, Wako (JP); Naotaka Kumakiri, Wako (JP); Kohei Okimoto, Wako (JP); Hironori Takano, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/346,131

(22) PCT Filed: Nov. 11, 2016

(86) PCT No.: PCT/JP2016/083499
§ 371 (c)(1),
(2) Date: Apr. 30, 2019

(87) PCT Pub. No.: WO2018/087877
PCT Pub. Date: May 17, 2018

(65) Prior Publication Data
US 2019/0263262 A1 Aug. 29, 2019

(51) Int. Cl.
*B60K 28/06* (2006.01)
*B60W 30/14* (2006.01)
(Continued)

(52) U.S. Cl.
CPC .............. *B60K 28/06* (2013.01); *B60R 11/04* (2013.01); *B60W 30/143* (2013.01);
(Continued)

(58) Field of Classification Search
CPC .................. B60K 28/06; B60R 11/04; B60W 2040/0827; B60W 2540/26;
(Continued)

(56) References Cited

U.S. PATENT DOCUMENTS

2010/0253526 A1* 10/2010 Szczerba .............. B60K 28/066
340/576
2014/0300478 A1* 10/2014 Kume .................. B60K 28/066
340/576

FOREIGN PATENT DOCUMENTS

JP 2001-219760 8/2001
JP 2005-352895 12/2005
(Continued)

OTHER PUBLICATIONS

International Search Report and Written Opinion for International Application No. PCT/JP2016/083499 dated Jan. 31, 2017, 9 pgs.
(Continued)

*Primary Examiner* — Omeed Alizada
(74) *Attorney, Agent, or Firm* — Amin, Turocy & Watson, LLP

(57) ABSTRACT

A vehicle control system includes: an automated driving controller that is configured to execute automated driving of automatedly controlling at least one of speed control and steering control of a vehicle; an estimator that is configured to estimate a degree of wakefulness of a vehicle occupant of the vehicle; and an output controller that is configured to cause an outputter to output a first content requiring the vehicle occupant of the vehicle engage in active behavior in a case in which the degree of wakefulness is estimated as being equal to or lower than a criterion by the estimator when the automated driving is executed by the automated driving controller, whereby the degree of wakefulness of the
(Continued)

vehicle occupant of the vehicle can be maintained at a necessary level or higher in automated driving.

13 Claims, 10 Drawing Sheets

(51) Int. Cl.
    *B60W 30/18*           (2012.01)
    *B60W 40/08*           (2012.01)
    *G06K 9/00*            (2006.01)
    *B60R 11/04*           (2006.01)

(52) U.S. Cl.
    CPC ...... *B60W 30/18163* (2013.01); *B60W 40/08* (2013.01); *G06K 9/00845* (2013.01); *B60W 2040/0827* (2013.01); *B60W 2540/26* (2013.01); *B60W 2710/20* (2013.01)

(58) Field of Classification Search
    CPC ........... B60W 2710/20; B60W 30/143; B60W 30/18163; B60W 40/08; G06K 9/00791; G06K 9/00845
    See application file for complete search history.

(56) References Cited

FOREIGN PATENT DOCUMENTS

| | | |
|---|---|---|
| JP | 2006-101425 | 4/2006 |
| JP | 2006101425 A * | 4/2006 |
| JP | 2014-021873 | 2/2014 |
| JP | 2014-203345 | 10/2014 |
| JP | 2015-032054 | 2/2015 |
| JP | 2015-096413 | 5/2015 |

OTHER PUBLICATIONS

Japanese Office Action for Japanese Patent Application No. 2018-549709 dated Jul. 21, 2020.

* cited by examiner

| | DETAILS OF CONTENT | REQUIREMENT LEVEL |
|---|---|---|
| CONTENT NOT REQUIRING ACTIVE BEHAVIOR | VIDEO, RADIO, MUSIC, DVD | 0 |
| CONTENT REQUIRING ACTIVE BEHAVIOR | CONTENT REQUIRING OPERATION FOR SCREEN | 1 |
| | CONTENT REQUIRING MORE COMPLEX OPERATION THAN REQUIREMENT LEVEL 1 | 2 |
| | QUIZ, KARAOKE, CONVERSATION, GAME, PHONE CALL | 3 |

VEHICLE CONTROL SYSTEM, VEHICLE CONTROL METHOD, AND VEHICLE CONTROL PROGRAM

TECHNICAL FIELD

The present invention relates to a vehicle control system, a vehicle control method, and a vehicle control program.

BACKGROUND ART

Conventionally, a vehicle driving support device that causes an outputter to output a warning or notifies reduction of a degree of driver's wakefulness to a terminal device carried by a police officer or the like in a case in which the degree of driver's wakefulness reduces is known (for example, see Patent Document 1).

CITATION LIST

Patent Literature

[Patent Document 1]
Japanese Unexamined Patent Application, First Publication No. 2001-219760

SUMMARY OF INVENTION

Technical Problem

However, there are cases in which the conventional technology is insufficient as a process performed in a case in which a degree of driver's wakefulness decreases.

The present invention is implemented in consideration of such a situation, and one object thereof is to provide a vehicle control system, a vehicle control method, and a vehicle control program capable of maintaining the degree of wakefulness of a vehicle occupant of a vehicle at a level equal to or higher than a level required for automated driving.

Solution to Problem

An invention according to claim 1 is a vehicle control system (1) including: an automated driving controller (100) configured to execute automated driving of automatedly controlling at least one of speed control and steering control of a vehicle; an estimator (154) configured to estimate a degree of wakefulness of a vehicle occupant of the vehicle; and an output controller (156) configured to cause an outputter to output a first content requiring the vehicle occupant of the vehicle engage in active behavior in a case in which the degree of wakefulness is estimated as being equal to or lower than a criterion by the estimator when the automated driving is executed by the automated driving controller.

An invention according to claim 2 is the vehicle control system according to claim 1, in which the first content is a content requiring more active behavior than a second content output before the first content.

An invention according to claim 3 is the vehicle control system according to claim 1, in which, in a case in which a content different from the first content is continuously output for a predetermined time by the output controller, the estimator is configured to estimate that the degree of wakefulness of the vehicle occupant of the vehicle is equal to or lower than the criterion.

An invention according to claim 4 is the vehicle control system according to claim 1, in which, the estimator is configured to estimate whether or not the degree of wakefulness of the vehicle occupant of the vehicle is equal to or lower than the criterion when a third content having a lower degree of requiring the vehicle occupant of the vehicle engage in active behavior than the first content is output by the output controller.

An invention according to claim 5 is the vehicle control system according to claim 1 further comprising a reaction detector (152) configured to detect a reaction for a content of the vehicle occupant of the vehicle, in which the estimator is configured to estimate that the degree of wakefulness of the vehicle occupant of the vehicle is not equal to or lower than the criterion in a case in which a reaction for the first content is detected by the reaction detector.

An invention according to claim 6 is the vehicle control system according to claim 5 in which the output controller is configured to cause the outputter to output a content output before the outputter outputs the first content in a case in which the estimator is configured to estimate that the degree of wakefulness of the vehicle occupant of the vehicle is not equal to or lower than the criterion in accordance with a reaction of the vehicle occupant of the vehicle for the content.

An invention according to claim 7 is the vehicle control system according to claim 1 further including a state detector configured to detect a state of the vehicle occupant of the vehicle, in which the estimator is configured to estimate reduction of the degree of wakefulness on the basis of a result of detection acquired by the state detector.

An invention according to claim 8 is the vehicle control system according to claim 1, in which the output controller is configured to select a content associated with the degree of wakefulness from among contents requiring a plurality of vehicle occupants of the vehicle engage in active behaviors on the basis of the degree of wakefulness of the vehicle occupant of the vehicle that is estimated by the estimator and is configured to cause the outputter to output the selected content.

An invention according to claim 9 is the vehicle control system according to claim 1, in which the output controller is configured to select the first content in accordance with a configuration of the vehicle components of the vehicle and cause the outputter to output the selected first content.

An invention according to claim 10 is the vehicle control system according to claim 1 further including an inputter configured to accept an input operation of the vehicle occupant of the vehicle in which the first content is set in accordance with an input operation for the inputter among a plurality of contents.

An invention according to claim 11 is a vehicle control method using an in-vehicle computer, the vehicle control method including: estimating a degree of wakefulness of a vehicle occupant of a vehicle when automated driving is executed by an automated driving controller that is configured to execute the automated driving of automatedly controlling at least one of speed control and steering control of the vehicle; and causing an outputter to output a first content requiring the vehicle occupant of the vehicle engage in active behavior in a case in which the degree of wakefulness is estimated as being equal to or lower than a criterion.

An invention according to claim 12 is a vehicle control program causing an in-vehicle computer to execute: estimating a degree of wakefulness of a vehicle occupant of a vehicle when automated driving is executed by an automated driving controller that is configured to execute the automated driving of automatedly controlling at least one of speed control and steering control of the vehicle; and causing an outputter to output a first content requiring the vehicle occupant of the vehicle engage in active behavior in a case in which the degree of wakefulness is estimated as being equal to or lower than a criterion.

Advantageous Effects of Invention

According to the inventions described in claim 1 to 5, 7, 11, or 12, when automated driving is executed, the degree of wakefulness of the vehicle occupant of the vehicle is estimated, and, in a case in which the degree of wakefulness is estimated as being equal to or lower than the criterion, the outputter is caused to output a first content requiring the vehicle occupant of the vehicle engage in active behavior, and accordingly, the degree of wakefulness of the vehicle occupant of the vehicle can be maintained at a necessary level or higher in automated driving.

According to the invention described in claim 6, in a case in which there is a reaction to a content, the output controller causes the outputter to output a content that is output before the outputter outputs the first content, and accordingly, the content, which is output before the first content is output, is output without the vehicle occupant of the vehicle performing a complicated operation. As a result, the convenience of the vehicle occupant of the vehicle is improved.

According to the inventions of claims 8 and 9, the output controller can cause the outputter to output a content requiring active behavior in which a plurality of vehicle occupants can participate even in a case in which there are a plurality of vehicle occupants of the vehicle, and accordingly, the convenience of the vehicle occupants of the vehicle can be improved.

According to the invention described in claim 10, the first content is set in accordance with an input operation with respect to the inputter among a plurality of contents, and accordingly, the vehicle occupant can set a preferred content.

BRIEF DESCRIPTION OF DRAWINGS

FIG. 4 is a diagram showing one example of a content table 162.

DESCRIPTION OF EMBODIMENTS

First Embodiment

Hereinafter, a vehicle control system, a vehicle control method, and a vehicle control program according to embodiments of the present invention will be described with reference to the drawings.

Figure 1:
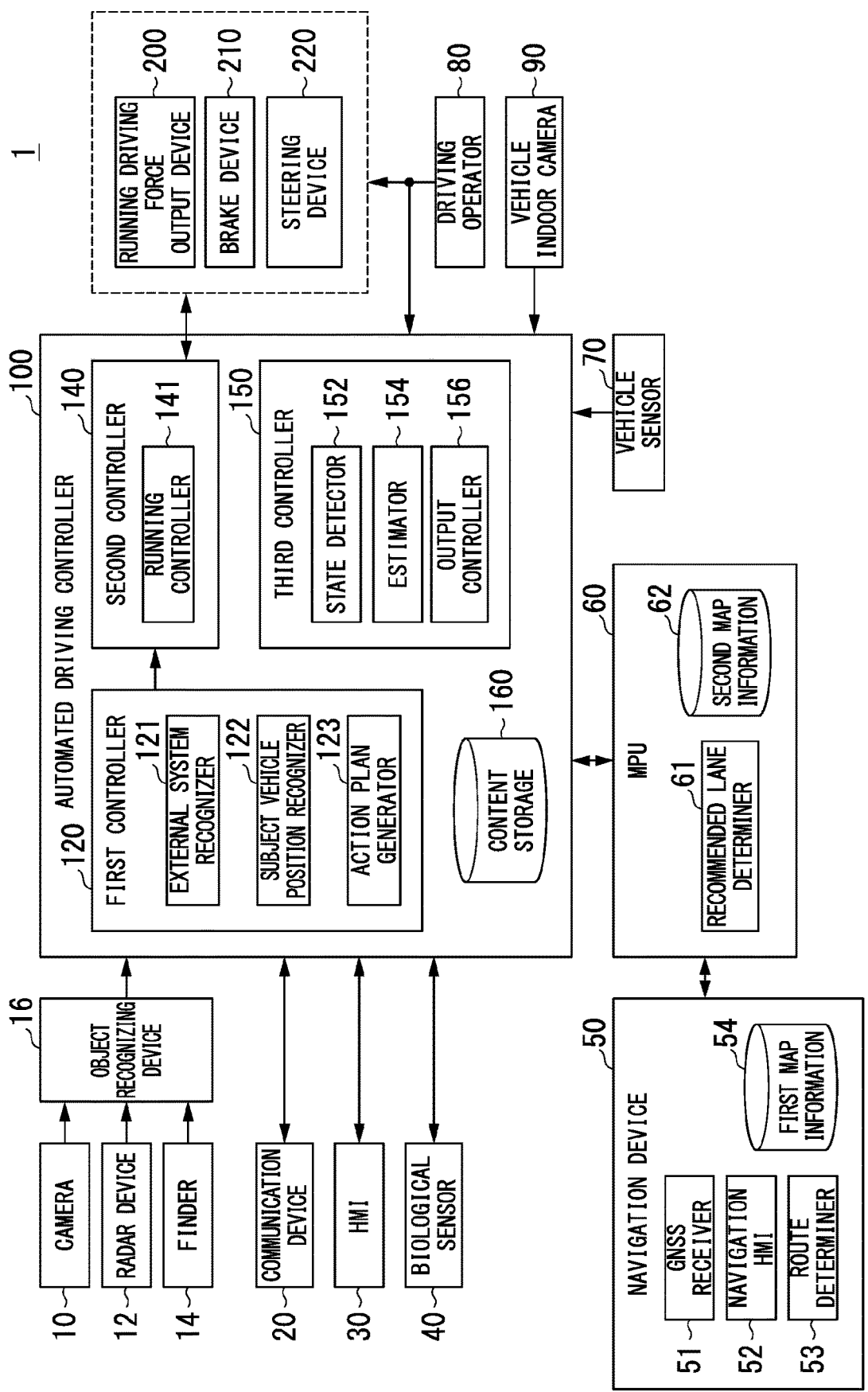
FIG. 1 is a configuration diagram of a vehicle system 1 including an automated driving controller 100.

FIG. 1 is a configuration diagram of a vehicle system 1 including an automated driving controller 100. A vehicle in which the vehicle system 1 is mounted is, for example, a vehicle having two wheels, three wheels, four wheels, or the like, and a driving source thereof is an internal combustion engine such as a diesel engine or a gasoline engine, an electric motor, or a combination thereof. An electric motor operates using power generated using a power generator connected to an internal combustion engine or discharge power of a secondary cell or a fuel cell.

The vehicle system 1, for example, includes a camera 10, a radar device 12, a finder 14, an object recognizing device 16, a communication device 20, a human machine interface (HMI) 30, a biological sensor 40, a navigation device 50, a micro-processing unit (MPU) 60, a vehicle sensor 70, a driving operator 80, a vehicle indoor camera 90, an automated driving controller 100, a running driving force output device 200, a brake device 210, and a steering device 220. Such devices and controller s are interconnected using a multiplex communication line such as a controller area network (CAN) communication line, a serial communication line, a radio communication network, or the like. In addition, the configuration shown in FIG. 1 is merely one example, and thus, some components may be omitted, and, furthermore, another component may be added thereto.

The camera 10, for example, is a digital camera using a solid-state imaging device such as a charge coupled device (CCD) or a complementary metal oxide semiconductor (CMOS). One or a plurality of cameras 10 are installed at arbitrary places in a vehicle (hereinafter, referred to as a subject vehicle M) in which the vehicle system 1 is mounted. In a case in which the side in front is to be imaged, the camera 10 is installed at an upper part of a front windshield, a rear face of a rear-view mirror, or the like. The camera 10, for example, repeatedly images the vicinity of the subject vehicle M periodically. The camera 10 may be a stereo camera.

The radar device 12 emits radiowaves such as millimeter waves to the vicinity of the subject vehicle M and detects at least a position (a distance and an azimuth) of an object by detecting radiowaves (reflected waves) reflected by the object. One or a plurality of radar devices 12 are installed at arbitrary places in the subject vehicle M. The radar device 12 may detect a position and a speed of an object using a frequency modulated continuous wave (FM-CW) system.

The finder 14 is a light detection and ranging or a laser imaging detection and ranging (LIDAR) finder that detects a distance to a target by measuring light scattered from emitted light. One or a plurality of finders 14 are installed at arbitrary places in the subject vehicle M.

The object recognizing device 16 may perform a sensor fusion process on results of detection using some or all of the camera 10, the radar device 12, and the finder 14, thereby recognizing a position, a type, a speed, and the like of an object. The object recognizing device 16 outputs a result of recognition to the automated driving controller 100.

The communication device 20, for example, communicates with other vehicles present in the vicinity of the subject vehicle M using a cellular network, a Wi-Fi network, Bluetooth (registered trademark), dedicated short range communication (DSRC), or the like or communicates with various server apparatuses through a radio base station.

The HMI 30 presents various types of information to a vehicle occupant of the subject vehicle M and receives an input operation performed by a vehicle occupant. The HMI 30 includes various display devices, a speaker, a buzzer, a switch, a key, a microphone, and the like. In addition, a display and an inputter are integrally formed in the HMI 30. The HMI 130 includes a touch panel and a head-up display. The touch panel is disposed in an instrument panel. The head-up display reflects an image onto a front window and displays the image within a field of view of the vehicle occupant of the vehicle.

The biological sensor 40 is disposed at a place such as a seat of a vehicle occupant, a steering wheel, or the like of the vehicle into which a part of the body of a vehicle occupant is brought into contact. The biological sensor 40, for example, detects a heart rate, a body temperature, the pulse, and the like.

The navigation device 50, for example, includes a global navigation satellite system (GNSS) receiver 51, a navigation HMI 52, and a route determiner 53 and stores first map information 54 in a storage device such as a hard disk drive (HDD) or a flash memory. The GNSS receiver identifies a position of the subject vehicle M on the basis of signals received from GNSS satellites. The position of the subject vehicle M may be identified or complemented by an inertial navigation system (INS) using an output of the vehicle sensor 70. The navigation HMI 52 includes a display device, a speaker, a touch panel, a key, and the like. A part or the whole of the navigation HMI 52 and the HMI 30 described above may be configured to be shared. The route determiner 53, for example, determines a route from a location of the subject vehicle M identified by the GNSS receiver 51 (or an input arbitrary location) to a destination input by a vehicle occupant using the navigation HMI 52 by referring to the first map information 54. The first map information 54, for example, is information in which a road form is represented by respective links representing a road and respective nodes connected using the links. The first map information 54 may include a curvature of each road, point of interest (POI) information, and the like. The route determined by the route determiner 53 is output to the MPU 60. In addition, the navigation device 50 may perform route guidance using the navigation HMI 52 on the basis of the route determined by the route determiner 53. Furthermore, the navigation device 50, for example, may be implemented by a function of a terminal device such as a smartphone or a tablet terminal carried by a user. In addition, the navigation device 50 may transmit a current location and a destination to a navigation server through the communication device 20 and acquire a route received from the navigation server as a reply.

The MPU 60, for example, functions as a recommended lane determiner 61 and maintains second map information 62 in a storage device such as an HDD or a flash memory. The recommended lane determiner 61 divides a route provided from the navigation device 50 into a plurality of blocks (for example, divides the route into blocks of 100 m in the advancement direction of the vehicle) and determines a target lane for each block by referring to the second map information 62. The recommended lane determiner 61 determines which lane to run from the left side. In a case in which a branching place, a merging place, or the like is present in the route, the recommended lane determiner 61 determines a recommended lane such that the subject vehicle M can run on a reasonable route for advancement to divergent destinations.

The second map information 62 is map information having an accuracy higher than that of the first map information 54. The second map information 62, for example, includes information of the center of respective lanes, information on boundaries between lanes, or the like. In addition, in the second map information 62, road information, traffic regulations information, address information (address and zip code), facilities information, telephone information, and the like may be included. In the road information, information representing a type of road such as an expressway, a toll road, a national highway, or a prefectural road and information such as the number of lanes of a road, a width of each lane, a gradient of a road, a position of a road (three-dimensional coordinates including longitude, latitude, and a height), a curvature of the curve of a lane, locations of merging and branching points of lanes, a sign installed on a road, and the like are included. The second map information 62 may be updated as is necessary by accessing another device using the communication device 20.

The vehicle sensor 70 includes a vehicle speed sensor detecting a speed of the subject vehicle M, an acceleration sensor detecting an acceleration, a yaw rate sensor detecting an angular velocity around a vertical axis, an azimuth sensor detecting the azimuth of the subject vehicle M, and the like.

The driving operator 80, for example, includes an acceleration pedal, a brake pedal, a shift lever, a steering wheel, and other operators. A sensor detecting the amount of an operation or the presence/absence of an operation is installed in the driving operator 80, and a result of detection acquired by the sensor described above is output to one or both of the automated driving controller 100 and the running driving force output device 200, the brake device 210, or the steering device 220.

The vehicle indoor camera 90 images an upper body half by focusing on the face of a vehicle occupant sitting on a driver seat. An image captured by the vehicle indoor camera 90 is output to the automated driving controller 100.

The automated driving controller 100, for example, includes a first controller 120, a second controller 140, a third controller 150, and a content storage 160. Each of the first controller 120, the second controller 140, and the third controller 150 is implemented by a processor such as a central processing unit (CPU) executing a program (software). Some or all of the functional units may be implemented by hardware such as a large scale integration (LSI), an application specific integrated circuit (ASIC), a field-programmable gate array (FPGA), or the like or may be implemented by cooperation between software and hardware.

The first controller 120, for example, includes the external system recognizer 121, the subject vehicle position recognizer 122, and an action plan generator 123.

The external system recognizer 121 recognizes states of surrounding vehicles such as positions, speeds, and accelerations on the basis of information input from the camera 10, the radar device 12, and the finder 14 through the object recognizing device 16. The position of a surrounding vehicle may be represented as a representative point of the surrounding vehicle such as the center of gravity, a corner, or the like and may be represented by an area represented by the contour of the surrounding vehicle. The "state" of a surrounding vehicle may include an acceleration or a jerk or may be an "action state" (for example, the vehicle is changing lanes or is to change lanes) of the surrounding vehicle. In addition, the external system recognizer 121 may recognize positions of a guard rail and a telegraph pole, a parked vehicle, a pedestrian, and other objects in addition to the surrounding vehicles.

The subject vehicle position recognizer 122, for example, recognizes a lane (running lane) in which the subject vehicle M runs and a relative position and a posture of the subject vehicle M with respect to the running lane. The subject vehicle position recognizer 122, for example, by comparing a pattern (for example, an array of solid lines and broken lines) of a road partition line that is acquired from the second map information 62 with a pattern of the road partition line in the vicinity of the subject vehicle M that is recognized from an image captured by the camera 10, recognizes a running lane. In the recognition, the position of the subject vehicle M acquired from the navigation device 50 and a processing result acquired using the INS may be added.

Figure 2:
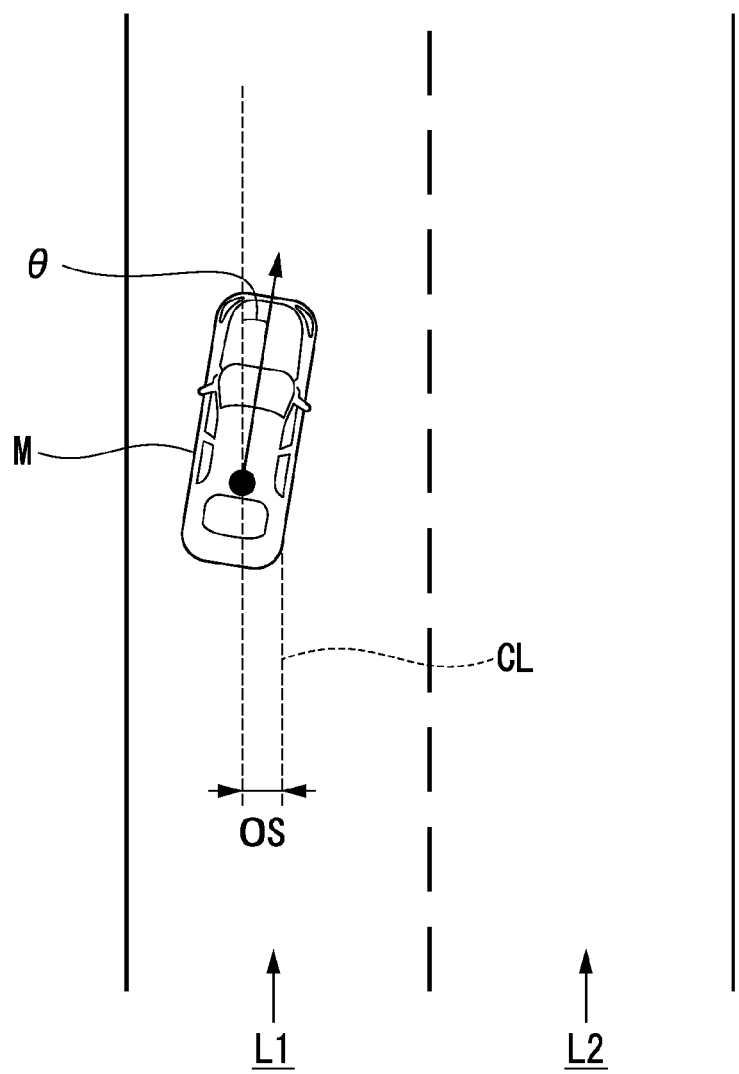
FIG. 2 is a diagram showing a view in which a relative position and a posture of a subject vehicle M with respect to a running lane L1 are recognized by a subject vehicle position recognizer 122.

Then, the subject vehicle position recognizer 122, for example, recognizes a position and a posture of the subject vehicle M with respect to the running lane. FIG. 2 is a diagram showing a view in which a relative position and a posture of a subject vehicle M with respect to a running lane L1 are recognized by the subject vehicle position recognizer 122. The subject vehicle position recognizer 122, for example, recognizes an offset OS of a reference point (for example, center of gravity) of the subject vehicle M from running lane center CL and an angle θ of an advancement direction of the subject vehicle M formed with respect to a line acquired by aligning the running lane center CL as a relative position and a posture of the subject vehicle M with respect to the running lane L1. In addition, instead of this, the subject vehicle position recognizer 122 may recognize a position of the reference point of the subject vehicle M with respect to one side end of its own lane L1 or the like as a relative position of the subject vehicle M with respect to the running lane. The relative position of the subject vehicle M recognized by the subject vehicle position recognizer 122 is provided for the recommended lane determiner 61 and the action plan generator 123.

The action plan generator 123 determines events to be sequentially executed in automated driving such that the subject vehicle M runs in a recommended lane determined by the recommended lane determiner 61 and deals with to a surrounding status of the subject vehicle M. As the events, for example, there are a constant-speed running event in which the subject vehicle runs at a constant speed in the same running lane, a following running event in which the subject vehicle follows a vehicle running ahead, a lane changing event, a merging event, a branching event, an emergency stop event, a handover event for ending automated driving and switching to manual driving, and the like. In addition, during the execution of such an event, there are cases in which an action for avoidance is planned on the basis of surrounding statuses of the subject vehicle M (the presence/absence of surrounding vehicles and pedestrians, lane contraction according to road construction, and the like).

The action plan generator 123 generates a target locus in which the subject vehicle M will run in the future. The target locus, for example, includes a speed factor. For example, a plurality of reference times in the future may be set for every predetermined sampling time (for example, a fraction of a [sec]), and the target locus is generated as a set of target positions (locus points) that the subject vehicle is to reach at such reference times. For this reason, in a case in which a gap between locus points is large, this represents high-speed running in a section between the locus points.

Figure 3:
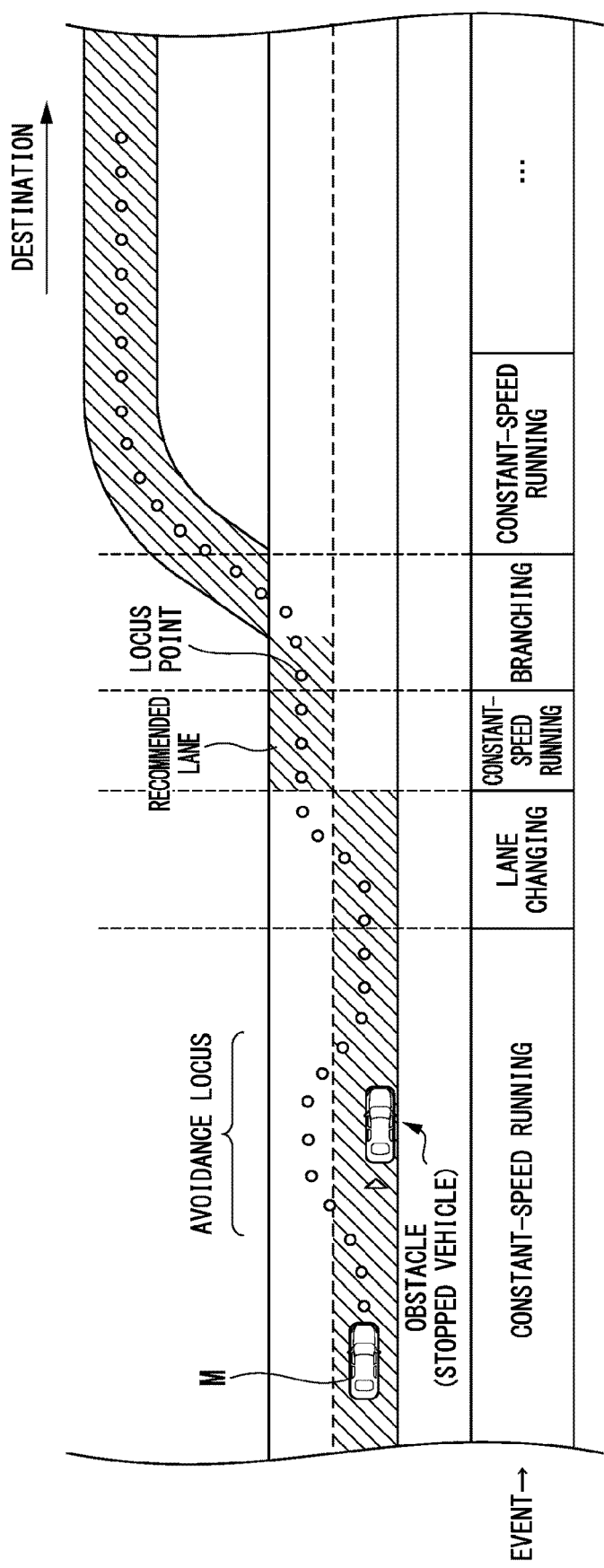
FIG. 3 is a diagram showing a view in which a target locus is generated on the basis of a recommended lane.

FIG. 3 is a diagram showing a view in which a target locus is generated on the basis of a recommended lane. As shown in the drawing, the recommended lane is set such that it is convenient for the subject vehicle to run along a route to a destination. When the subject vehicle reaches a position before a predetermined distance from a recommended lane switching place (may be determined in accordance with a type of event), the action plan generator 123 starts the lane changing event, the branching event, the merging event, or the like. In a case in which there is a need for avoiding an obstacle during the execution of each event, as shown in the drawing, an avoidance locus is generated.

The action plan generator 123, for example, generates a plurality of candidates of a target locus and selects a target locus that is optimal at that time point on the basis of the viewpoints of safety and efficiency.

The second controller 140 includes a running controller 141. The running controller 141 controls the running driving force output device 200, the brake device 210, and the steering device 220 such that the subject vehicle M passes through a target locus generated by the action plan generator 123 at a scheduled time.

The third controller 150 includes a state detector 152, an estimator 154, and an output controller 156. The "vehicle control system" includes the action plan generator 123, the running controller 141, and the third controller 150.

The state detector 152 acquires information representing a state of a vehicle occupant (driver) of the vehicle. The state detector 152 is one example of a "reaction detector". Information representing the state of a vehicle occupant of a vehicle, for example, is information acquired by the biological sensor 40 or an image captured by the vehicle indoor camera 90.

The estimator 154 estimates a degree of wakefulness of a vehicle occupant of the vehicle on the basis of information acquired by the state detector 152. The degree of wakefulness is used as information representing a degree at which a vehicle occupant of a vehicle can monitor the surroundings when automated driving is executed. It is assumed that the vehicle occupant of the vehicle can sufficiently monitor the surroundings in a state in which the degree of wakefulness exceeds a criterion, and it is assumed that the vehicle occupant of the vehicle cannot sufficiently monitor the surroundings in a state in which the degree of wakefulness is equal to or lower than the criterion. More specifically, a state in which the degree of wakefulness is equal to or lower than the criterion is a state in which the vehicle occupant of the vehicle has entered a light sleep, a state in which the vehicle occupant is in a light sleep, or a state in which a consciousness level is lowered. In contrast to this, a state in which the consciousness level is not lowered is a state in which the degree of wakefulness is higher than the criterion.

In addition, in a case in which a non-active content (to be described later) is continuously output for a predetermined time, the estimator 154 may estimate that the degree of wakefulness of the vehicle occupant of the vehicle has lowered to the criterion or less. The reason for this is that, in cases in which a non-active content is continuously output for a predetermined time, there is a case in which the vehicle occupant of the vehicle is not engaging in active behavior.

The estimator 154, for example, derives a degree of wakefulness of a vehicle occupant of a vehicle on the basis of images of a time series that have been repeatedly captured by the vehicle indoor camera 90. For example, the estimator 154 may detect contours of the eyes and the mouth, the direction of the face, and the like on the basis of feature points of a vehicle occupant of the vehicle extracted from the image and derives a degree of wakefulness on the basis of the motion of the contours and the direction of the face that have been detected. For example, in a case in which one or a plurality of conditions among the following conditions are satisfied, the estimator 154 estimates that the degree of wakefulness of the vehicle occupant of the vehicle is equal to or lower than the criterion. The conditions described above are (1) the number of times of movement of the contours of the eyes per unit time is equal to or smaller than a predetermined number of times, (2) a state in which the contours (lids) of the eyes are closed (in a closed state) is continues over a predetermined time or longer, (3) a state in which the direction of the face inclines downward for a predetermined time or more is continuous for a predetermined number of times or more, and the like. In addition, the estimator 154 may estimate a degree of wakefulness of a vehicle occupant of the vehicle on the basis of information detected by the biological sensor 40.

When automated driving is executed by the automated driving controller 100, in a case in which it is estimated by the estimator 154 that the degree of wakefulness is equal to or lower than the criterion, the output controller 156 outputs a content requiring the vehicle occupant of the vehicle engage in active behavior to the HMI 30. Details of the process of the output controller 156 will be described later.

A content table 162 is stored in the content storage 160. The content table 162 is a table in which details of a content output by the HMI 30 are set. FIG. 4 is a diagram showing one example of the content table 162. For example, contents output by the HMI 30 are classified into a content not requiring active behavior (hereinafter, referred to as a "non-active content") and a content requiring active behavior (hereinafter, referred to as an "active content"). An active behavior is a content requiring a certain reaction of a vehicle occupant of a vehicle in response to a content. The content table 162 represents such classifications for each type of content. In addition, a requirement level of an active behavior is defined in the content table 162. In a case in which the requirement level is high, more active behavior than that in a case in which the requirement level is low is required. In the content table 162, for a non-active content, a requirement level of active behavior is set to "zero". A non-active content, for example, is an image displayed on the display, a voice output to the speaker, or the like. In a case in which a non-active content is an image displayed on the display, details of the content are television, a movie, and a DVD. In a case in which a non-active content is a voice output by the speaker, details of the content are radio, a CD, and the like.

For an active content, as a requirement level defined in the content table 162 becomes higher, more active behavior is required. An active content, for example, is a content requiring a certain reaction of a vehicle occupant of a vehicle for an image displayed on the display or a voice output to the speaker. In a case in which an active content is an image displayed on the display, details of the content associated with a requirement level "1", for example, require an operation on a screen of the display of the touch panel, and details of a content associated with a requirement level "2" require a more complicated operation than a required operation on the screen associated with the requirement level 1. In addition, details of a content associated with a requirement level "3" require more active behavior of a vehicle occupant of a vehicle than those of a content associated with the requirement level "2" and, for example, are a quiz, Karaoke, a conversion (a pseudo conversation with a computer), a game, telephoning, and the like. The telephoning represents that the HMI 30 is automatedly connected to a predetermined telephone, and a vehicle occupant of a vehicle has a phone call with a counterpart (a person or an automated response device) holding the telephone.

In addition, by operating the operator of the HMI 30, a vehicle occupant of a vehicle can arbitrarily set details of an active content that is output by the HMI 30 in a case in which the degree of wakefulness is equal to or lower than the criterion. In addition, a set active content (or a non-active content) may be added to or deleted from the content table 162 in accordance with an operation of the vehicle occupant of the vehicle. In such a case, the active content may be acquired through the communication device 20 and be stored in the content storage 160 or may be acquired from a storage medium connected to the automated driving controller 100 by a vehicle occupant of a vehicle and be stored in the content storage 160.

The running driving force output device 200 outputs a running driving force (torque) for allowing a vehicle to run to driving wheels. The running driving force output device 200, for example, includes a combination of an internal combustion engine, an electric motor, a transmission gear, and the like and an ECU controlling such components. The ECU controls the components described above on the basis of information input from the running controller 141 or information input from the driving operator 80.

The brake device 210, for example, includes a brake caliper, a cylinder delivering hydraulic pressure to the brake caliper, an electric motor generating hydraulic pressure in the cylinder, and a brake ECU. The brake ECU controls the electric motor on the basis of the information input from the running controller 141 or the information input from the driving operator 80 such that a brake torque corresponding to a braking operation is output to each vehicle wheel. The brake device 210 may include a mechanism that delivers a hydraulic pressure generated in accordance with an operation for a brake pedal included in the driving operator 80 to the cylinder through a master cylinder as a backup. In addition, the brake device 210 is not limited to the configuration described above and may be an electronic control-type hydraulic brake device that delivers a hydraulic pressure of the master cylinder to the cylinder by controlling an actuator on the basis of information input from the running controller 141.

The steering device 220, for example, includes a steering ECU and an electric motor. The electric motor, for example, changes the direction of the steering wheel by applying a force to a rack and pinion mechanism. The steering ECU changes the direction of the steering wheel by driving the electric motor in accordance with information input from the running controller 141 or information input from the driving operator 80.

Figure 5:
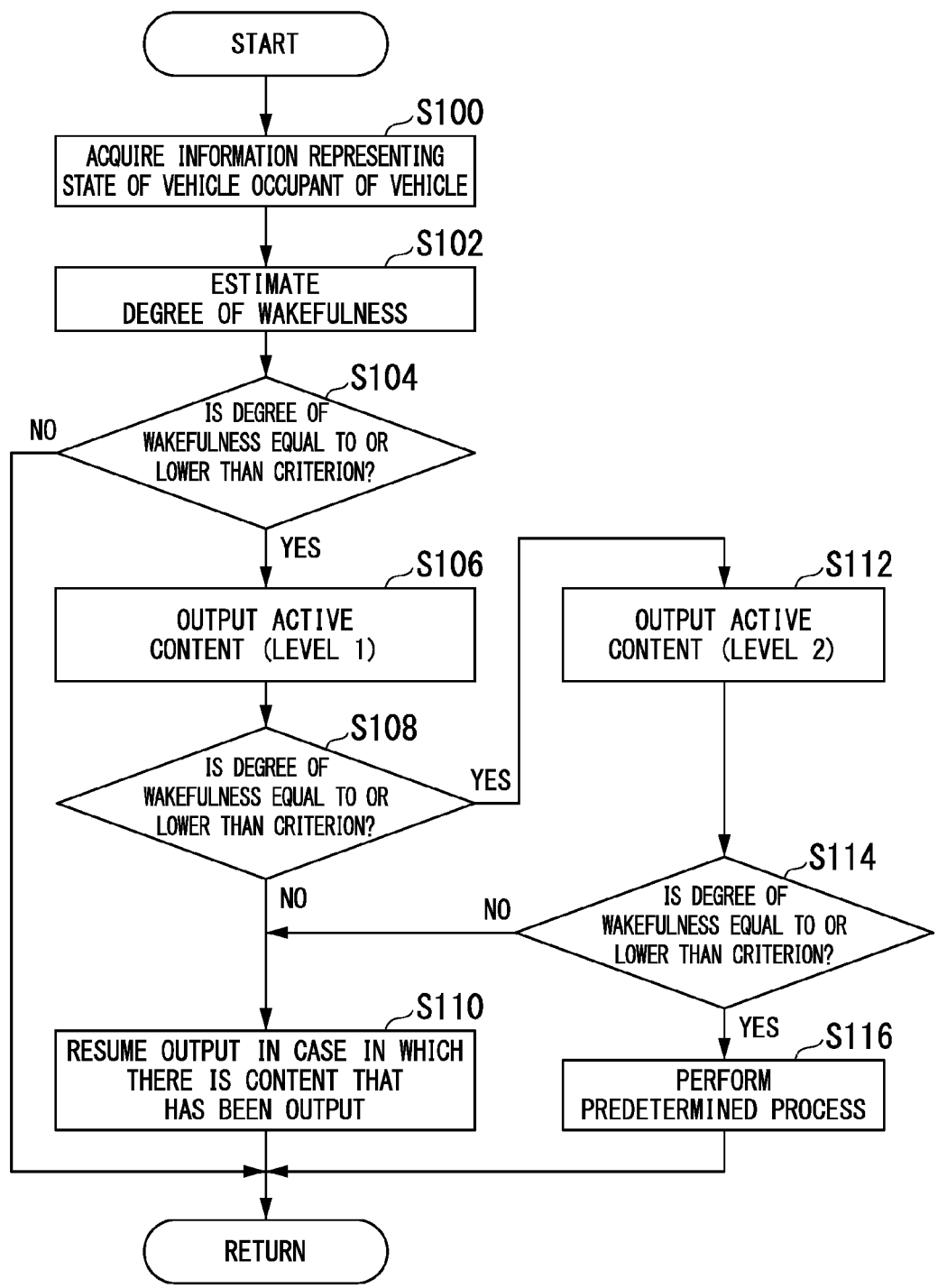
FIG. 5 is a flowchart showing the flow of a process executed by a third controller 150.

FIG. 5 is a flowchart showing the flow of a process executed by the third controller 150. The process of this flowchart, for example, is executed in a case in which automated driving is executed.

First, the state detector 152 acquires captured time-series images that have been repeatedly captured by the vehicle indoor camera 90 as information representing the state of a vehicle occupant of a vehicle (Step S100). Next, the estimator 154 estimates the degree of wakefulness on the basis of the images acquired in Step S100 (Step S102) and determines whether or not the degree of wakefulness is equal to or lower than a criterion (Step S104). In a case in which the degree of wakefulness is not equal to or lower than the criterion, the vehicle occupant of the vehicle is in a state in which he or she can monitor surroundings, and thus, the process of one routine of this flowchart ends.

In a case in which the degree of wakefulness is equal to or lower than the criterion, the output controller 156 outputs an active content (level 1) on the display of the HMI 30 during a predetermined time (Step S106). In addition, a description enclosed by parentheses represents a requirement level of an active content. Next, the output controller 156 requests the estimator 154 to estimate the degree of wakefulness of the vehicle occupant of the vehicle and determines whether or not the degree of wakefulness is equal to or lower than the criterion (Step S108). At this time, the estimator 154 may determine that the degree of wakefulness is not equal to or lower than the criterion on the basis of the presence of a reaction to an active content. A reaction associated with an active content, for example, is a reaction of the vehicle occupant of the vehicle for a requirement of the active content and, for example, a predetermined operation or a predetermined manipulation is performed. A predetermined operation may be an operation set in advance and, for example, is an operation of moving a part of the body such as a gesture, a wink, or the like of the vehicle occupant of the vehicle. A predetermined manipulation may be an input manipulation with respect to the HMI 30 or may be a voice input to a microphone from the vehicle occupant of the vehicle.

In a case in which the degree of wakefulness is not equal to or lower than the criterion, in a case in which there is a content output before the process of Step S106, the output controller 156 causes the display to output the content (Step S110). In a case in which a content is not output, output of the active content is stopped.

In a case in which the degree of wakefulness is equal to or lower than the criterion, the output controller 156 causes the display to output an active content (level 2) during a predetermined time (Step S112). Next, the estimator 154 determines whether or not the degree of wakefulness is equal to or lower than the criterion (Step S114). In a case in which the degree of wakefulness is not equal to or lower than the criterion, the process proceeds to the process of Step S110. In addition, in a case in which the degree of wakefulness is not equal to or lower than the criterion, the process may be returned to the process of Step S106.

In a case in which the degree of wakefulness is equal to or lower than the criterion, the output controller 156 executes a predetermined process (Step S116). The predetermined process is a process for waking up a vehicle occupant, a process of stopping the subject vehicle M at a safe place, a process of notifying information representing that the degree of wakefulness of the vehicle occupant of the vehicle to surrounding vehicles, or the like. The process of waking up the vehicle occupant, for example, is a process of vibrating a driver seat, outputting a warning to a speaker, or the like. In this way, the process of one routine of this flowchart ends.

In addition, in the process of the flowchart described above, although an active content (level 2) has been described to be output in a case in which the degree of wakefulness is equal to or lower than the criterion after an active content (level 1) is output during a predetermined time, an active content to be output may be arbitrarily set. The output controller 156, for example, may output an active content (level 1) in Step S106 and output an active content (level 3) in Step S112 or may output an active content (level 2) in Step S106 and output an active content (level 3) in Step S112.

In addition, the output controller 156 may output an active content (level 3) during a predetermined time after it is determined that the degree of wakefulness is equal to or lower than the criterion in the process of Step S114 and before the process of Step S116. Then, the output controller 156 may execute a predetermined process in a case in which the degree of wakefulness is determined to be equal to or lower than the criterion after the active content (level 3) is output during a predetermined time.

In accordance with the process described above, the output controller 156 outputs an active content requiring the vehicle occupant of the vehicle engage in active behavior in a case in which the degree of wakefulness is equal to or lower than the criterion, and accordingly, the degree of wakefulness of the vehicle occupant of the vehicle can be maintained at a required level or higher in automated driving.

Figure 6:
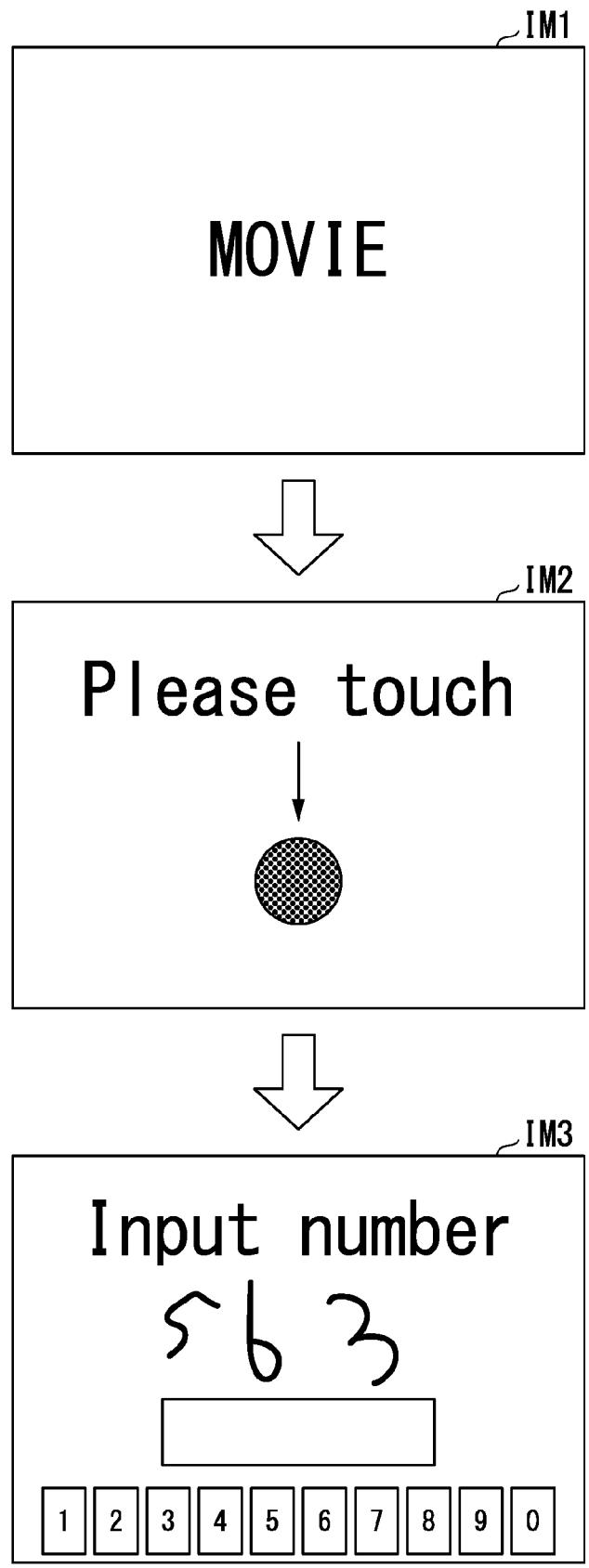
FIG. 6 is a diagram showing switching of a content in the process shown in FIG. 5.

FIG. 6 is a diagram showing content switching in the process shown in FIG. 5. For example, in a case in which the degree of wakefulness of the vehicle occupant of the vehicle becomes equal to or lower than the criterion in a state in which an image IM1 of a non-active content is displayed on the display, an image IM2 of an active content (level 1) is displayed on the display. In the example shown in the drawing, the active content (level 1) is a content requiring the vehicle occupant of the vehicle to perform a touch operation on a black circle in the image IM2. In a case in which the degree of wakefulness exceeds the criterion in accordance with a response (reaction) of the vehicle occupant of the vehicle to the requirements, the image displayed on the display is switched from the image IM2 to the image IM1. On the other hand, for example, in a case in which the vehicle occupant of the vehicle does not respond to the requirements, and the degree of wakefulness is equal to or lower than the criterion, the image displayed on the display is switched from the image IM2 to an image IM3.

The image IM3 is an image associated with an active content (level 2) and is a content requiring an input of a number (for example, "563") displayed in the image IM3 by operating number input buttons displayed on the display. In a case in which the degree of wakefulness becomes not equal to or lower than the criterion in accordance with a response of the vehicle occupant of the vehicle to the requirements, the image displayed on the display is switched from the image IM3 to the image IM1 (or the image IM2). On the other hand, in a case in which the vehicle occupant of the vehicle does not respond to the requirements, and the degree of wakefulness is equal to or lower than the criterion, for example, an image associated with an active content (level 3) is displayed on the display, or the automated driving controller 100 stops the subject vehicle M at a safe place.

Figure 7:
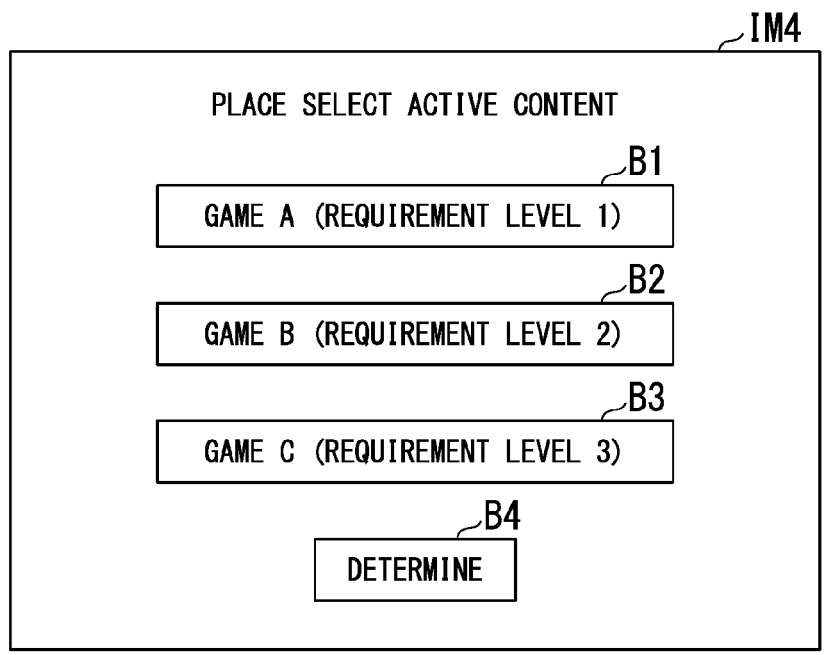
FIG. 7 is a diagram showing one example of an image IM4 displayed in a case in which an active content is set.

FIG. 7 is a diagram showing one example of an image IM4 displayed in a case in which an active content is set. For example, in the content table 162, a game A to a game C that are active contents are set. The games A to C respectively have requirement levels 1 to 3. For example, when the vehicle occupant of the vehicle executes a predetermined operation, an image IM4 for setting an active content is displayed on the display. In this image IM4, selection buttons B1 to B3 respectively used for selecting the games A to C and a determination button B4 used for determining the selected active content are included. When an input operation is performed on one selection button among the selection buttons B1 to B3, and an input operation is performed on the determination button B4 by the vehicle occupant, in a case in which the degree of wakefulness of the vehicle occupant of the vehicle reduces to be equal to or lower than the criterion, the active content determined by the vehicle occupant of the vehicle is displayed on the display. Accordingly, the vehicle occupant of the vehicle can select an active content in accordance with a taste.

According to the first embodiment described above, when automated driving is executed by the automated driving controller 100, in a case in which the estimator 154 estimates that the degree of wakefulness is equal or lower than the criterion, the output controller 156 outputs a first content requiring the vehicle occupant of the vehicle engage in active behavior using the HMI 30, and accordingly, the degree of wakefulness of the vehicle occupant of the vehicle can be maintained at a required level or higher in automated driving.

Second Embodiment

Hereinafter, a second embodiment will be described. In the first embodiment, it has been described that an active content is output in a case in which the degree of wakefulness becomes equal to or lower than the criterion regardless whether or not a content is output. On the other hand, in the second embodiment, in the estimator 154, when a content is output, an active content is output in a case in which the degree of wakefulness becomes equal to or lower than the criterion, and, when a content is not output, determination of whether or not the degree of wakefulness is equal to or lower than the criterion is not performed. Here, points that are different from those according to the first embodiment will be focused in description, and a description of functions and the like that are common to those according to the first embodiment will be omitted.

When a content having a lower degree at which the vehicle occupant of the vehicle is required to engage in active behavior than an active content is output using the output controller 156, the estimator 154 according to the second embodiment estimates whether or not the degree of wakefulness of the vehicle occupant of the vehicle is equal to or lower than a criterion on the basis of a state of the vehicle occupant of the vehicle.

Figure 8:
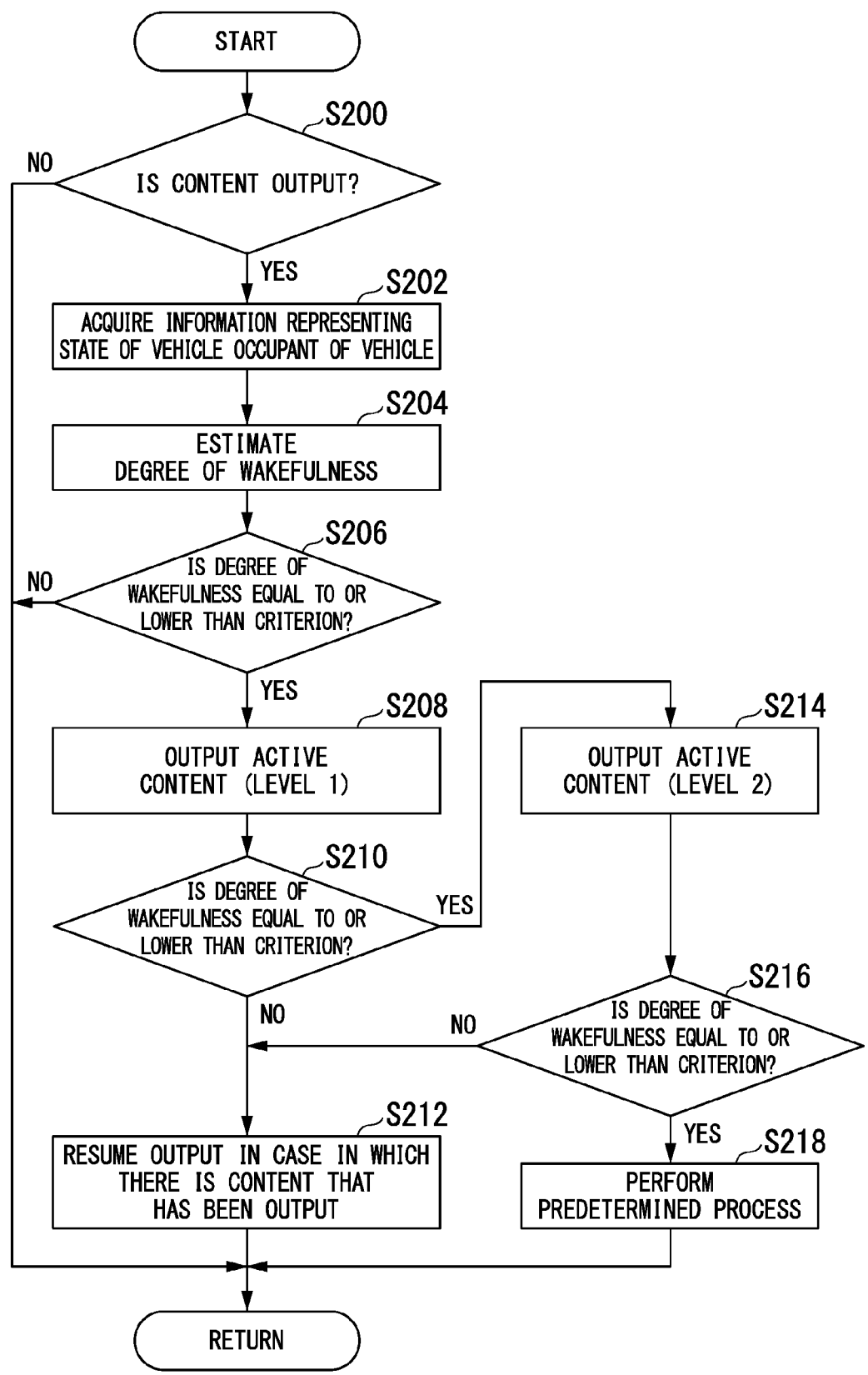
FIG. 8 is a flowchart showing the flow of a process executed by a third controller 150 according to a second embodiment.

FIG. 8 is a flowchart showing the flow of a process executed by a third controller 150 according to the second embodiment. First, the estimator 154 determines whether or not a content having a lower degree at which the vehicle occupant of the vehicle is required to engage in active behavior than an active content is output using the output controller 156 (Step S200). In a case in which a content having a low degree at which an active behavior is required is not output, the process of this flowchart ends. On the other hand, in a case in which a content having a low degree at which active behavior is required is output, the process proceeds to the process of Step S202. Processes of Step S202 to Step S218 of this flowchart are similar to the processes of Steps S100 to S116 of the flowchart shown in FIG. 5, and thus a description thereof will be omitted.

According to the second embodiment described above, the degree of wakefulness of the vehicle occupant of the vehicle can be maintained at a necessary level or higher in automated driving such that it is appropriate for the vehicle occupant of the vehicle to spend time inside the vehicle. For example, the reason for this is that, when the vehicle occupant of the vehicle outputs a content having a lower degree at which the vehicle occupant of the vehicle is required to engage in active behavior than an active content, in a case in which the degree of wakefulness of the vehicle occupant of the vehicle is equal to or lower than the criterion, an active content is output instead of the outputting content.

Third Embodiment

Hereinafter, a third embodiment will be described. In the first embodiment, when an active content is output to the HMI 30, the configuration (the number and attributes) of the vehicle occupant is not considered. In contrast to this, in the third embodiment, when an active content is output to the HMI 30, an active content with the configuration (the number and attributes) of the vehicle occupant of the vehicle taken into account is selected and output. Here, points that are different from those according to the first embodiment will be focused in description, and description of functions and the like that are common to those according to the first embodiment will be omitted.

Figures 9, 10:
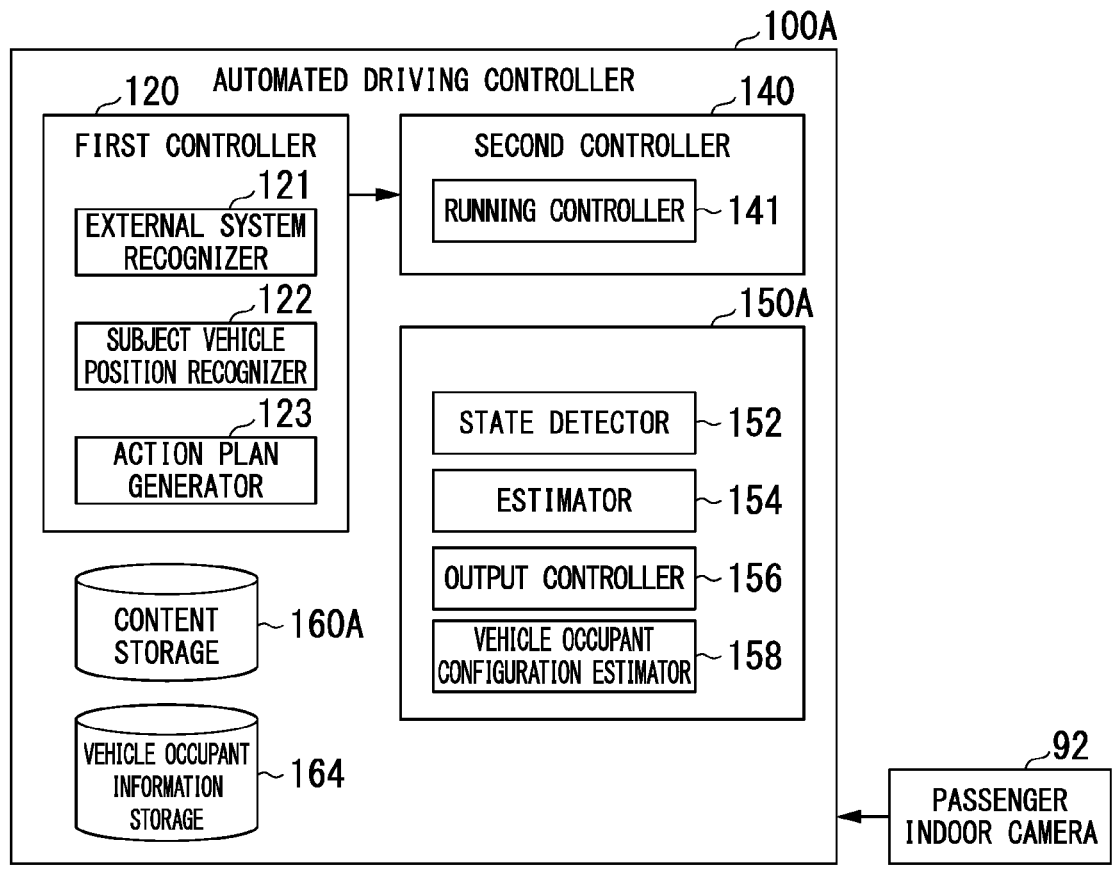
FIG. 9 is a functional configuration diagram of an automated driving controller 100A according to the second embodiment.
FIG. 10 is a diagram focusing on a content table 162A.

FIG. 9 is a functional configuration diagram of an automated driving controller 100A according to the third embodiment. A vehicle control system 1 further includes a passenger indoor camera 92 in addition to the functional components according to the first embodiment. The passenger indoor camera 92, for example, images an upper half body by focusing on a face of a vehicle occupant (passenger) sitting on a seat other than the driver seat. A captured image captured by the passenger indoor camera 92 is output to the automated driving controller 100A.

In addition, a third controller 150A of the automated driving controller 100A further includes a vehicle occupant configuration estimator 158, a content storage 160A, and a vehicle occupant information storage 164 in addition to the state detector 152, the estimator 154, and the output controller 156. The estimator 154 estimates a degree of wakefulness of a driver of the vehicle on the basis of an image captured by the vehicle indoor camera 90. In addition, the estimator 154 estimates a degree of wakefulness of a vehicle occupant other than the driver of the vehicle on the basis of an image captured by the passenger indoor camera 92.

In the vehicle occupant information storage 164, information such as a face image, sex, age, and the like of a vehicle occupant of the vehicle registered in advance by a vehicle occupant of the vehicle is stored. In addition, in the vehicle occupant information storage 164, feature quantities of a face of a person are stored for each attribute (age, sex, or the like) of the person. The vehicle occupant configuration estimator 158 estimates attributes of a vehicle occupant of the vehicle on the basis of feature quantities stored in the vehicle occupant information storage 164 and feature quantities extracted from images captured by the vehicle indoor camera 90 and the passenger indoor camera 92 and estimates the number of vehicle occupants of the vehicle. In addition, the vehicle occupant configuration estimator 158 may not count the number of vehicle occupants of the vehicle of which the degree of wakefulness is estimated as being low when counting the number of vehicle occupants of the vehicle used when contents are output. In other words, the vehicle occupant configuration estimator 158 sets the number of the driver of the vehicle and vehicle occupants of the vehicle of which the degree of wakefulness exceeds a criterion as the number of vehicle occupants of the vehicle used when contents are output. Accordingly, a vehicle occupant of the vehicle who is sleeping (or likely to sleep) does not need to be woken forcibly.

In addition, in the content storage 160A, N (here, "N" is an arbitrary natural number) is stored from the content table 162A. As N from the content table 162A, details of an active content output by the HMI 30 is set for a combination of the number and the attributes of vehicle occupants of the vehicle. This active content is a content in which one or a plurality of vehicle occupants can participate. FIG. 10 is a diagram focusing on the content table 162A. In the shown example, details of a content set for a combination in which vehicle occupants of the vehicle are four adults, and all of them are male. For example, in the content table 162A, a "word game" as an active content (level 1), a "card game" as an active content (level 2), and a game (for example, Mahjong) as an active content (level 3) are set.

Figure 11:
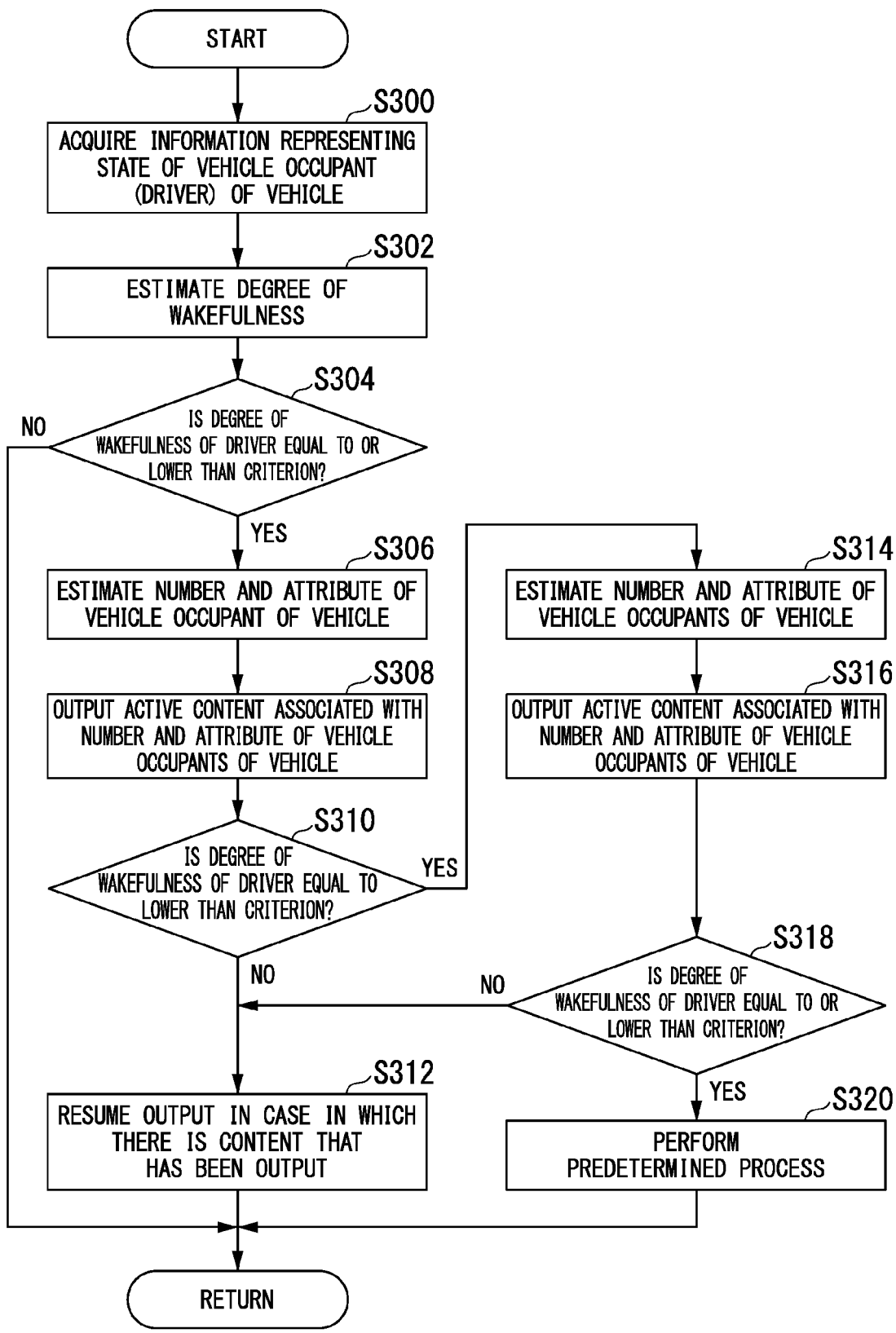
FIG. 11 is a flowchart showing the flow of a process executed by a third controller 150 according to a third embodiment.

FIG. 11 is a flowchart showing the flow of a process executed by the third controller 150A according to the third embodiment. First, the state detector 152 acquires captured time-series images acquired by repeatedly performing imaging using the vehicle indoor camera 90 and the passenger indoor camera 92 as information representing the state of vehicle occupants of the vehicle (Step S300). Next, the estimator 154 estimates a degree of wakefulness on the basis of the images acquired in Step S300 (Step S302) and determines whether or not the degree of wakefulness is equal to or lower than the criterion (Step S304). In a case in which the degree of wakefulness is not equal to or lower than the criterion, the process of one routine of this flowchart ends.

In a case in which the degree of wakefulness is equal to or lower than the criterion, the vehicle occupant configuration estimator 158 estimates the number and attributes of vehicle occupants of the vehicle on the basis of the images captured by the vehicle indoor camera 90 and the passenger indoor camera 92 (Step S306). Next, the output controller 156 outputs an active content (level 1) associated with the number and the attributes of vehicle occupants of the vehicle estimated by the vehicle occupant configuration estimator 158 to the display of the HMI 30 during a predetermined time by referring to the content table stored in the content storage 160A (Step S308). For example, in a case in which the number of vehicle occupants of the vehicle is four, and the output controller 156 selects a content in which four persons participate, the selected content may be output to displays of mobile terminals carried by the vehicle occupants of the vehicle. For example, a mobile terminal and the communication device 20 communicate with each other using near field communication such as Bluetooth. Accordingly, four persons can share the content and react to a requirement for the content.

Next, the estimator 154 determines whether or not a degree of wakefulness of the driver of the vehicle is equal to or lower than the criterion (Step S310). In a case in which the degree of wakefulness is not equal to or lower than the criterion, the output controller 156, in a case in which there is a content output before the process of Step S308, outputs the content to the display (Step S312).

In a case in which the degree of wakefulness is equal to or lower than the criterion, the vehicle occupant configuration estimator 158 estimates the number and attributes of vehicle occupants of the vehicle on the basis of images captured by the vehicle indoor camera 90 and the passenger indoor camera 92 (Step S314). In addition, in a case in which a degree of wakefulness of a vehicle occupant other than the driver of the vehicle reduces to be equal to or lower than the criterion, the vehicle occupant of which the degree of wakefulness has reduced to be equal to or lower than the criterion is excluded from the number of vehicle occupants of the vehicle used when a content is selected, and accordingly, the numbers of vehicle occupants of the vehicle estimated in Step S306 and Step S314 to be described later may be changed.

Next, the output controller 156 outputs an active content (level 2) associated with the number and the attributes of vehicle occupants of the vehicle estimated by the vehicle occupant configuration estimator 158 by referring to the content table stored in the content storage 160A to the display of the HMI 30 during a predetermined time (Step S316).

Next, the estimator 154 determines whether or not the degree of wakefulness is equal to or lower than the criterion (Step S318). In a case in which the degree of wakefulness is not equal to or lower than the criterion, the process proceeds to the process of Step S312. In a case in which the degree of wakefulness is equal to or lower than the criterion, the output controller 156 executes a predetermined process (Step S320). In addition, information urging to shift the driver may be output by the HMI 30 as the predetermined process. In this way, the process of one routine of this flowchart ends.

According to the third embodiment described above, the output controller 156 selects an active content output by the HMI 30 in accordance with the configuration of vehicle occupants of the vehicle estimated by the vehicle occupant configuration estimator 158 and outputs the selected active content, whereby the convenience of the vehicle occupants of the vehicle can be improved.

While forms for performing the present invention have been described using the embodiments, the present invention is not limited to such embodiments at all, and various modifications and substitutions may be made within a range not departing from the concept of the present invention.

REFERENCE SIGNS LIST

1 Vehicle system
100 Automated driving controller
120 First controller
121 External system recognizer
122 Subject vehicle position recognizer
123 Action plan generator
140 Second controller
141 Running controller
150 Third controller
152 State detector
154 Estimator
156 Output controller
158 Vehicle occupant configuration estimator
160, 160A Content storage
162, 162A Content table

What is claimed is:
1. A vehicle control system comprising:
   an automated driving controller configured to execute automated driving of automatedly controlling at least one of speed control and steering control of a vehicle;
   a first estimator configured to estimate a degree of wakefulness of a driver of the vehicle;
   a second estimator configured to estimate a number of vehicle occupants in the vehicle; and
   an output controller configured to select a first content requiring the driver of the vehicle to engage in active behavior based on the number of vehicle occupants estimated by the second estimator and cause an outputter to output the first content selected in a case in which the degree of wakefulness of the driver is estimated as being equal to or lower than a criterion by the first estimator when the automated driving is executed, wherein
the first estimator is further configured to estimate the degree of wakefulness of the vehicle occupants in the vehicle, wherein the second estimator is further configured to exclude occupants of the vehicle having a lower or equal degree of wakefulness than threshold, and wherein the output controller is further configured to:
select the first content requiring the driver of the vehicle engage in the active behavior based on a wakeful number of occupants having a higher degree of wakefulness than the threshold, and
cause the outputter to output the first content selected in a case in which the degree of wakefulness of the driver is estimated as being equal to or lower than the criterion by the first estimator when the automated driving is executed.

2. The vehicle control system according to claim 1, wherein the first content is a content requiring more active behavior than a second content output before the first content.

3. The vehicle control system according to claim 1, wherein, in a case in which a content different from the first content is continuously output for a predetermined time by the output controller, the first estimator is configured to estimate that the degree of wakefulness of the vehicle occupant of the vehicle is equal to or lower than the criterion.

4. The vehicle control system according to claim 1, wherein the first estimator is configured to estimate whether or not the degree of wakefulness of the vehicle occupant of the vehicle is equal to or lower than the criterion when a third content having a lower degree of requiring the vehicle occupant of the vehicle engage in the active behavior than the first content is output by the output controller.

5. The vehicle control system according to claim 1, further comprising a reaction detector configured to detect a reaction for a content of the vehicle occupant of the vehicle, wherein the first estimator is configured to estimate that the degree of wakefulness of the vehicle occupant of the vehicle is not equal to or lower than the criterion in a case in which the reaction for the content is detected by the reaction detector.

6. The vehicle control system according to claim 5, wherein the output controller is configured to cause the outputter to output a content output before the outputter outputs the first content in a case in which the first estimator is configured to estimate that the degree of wakefulness of the vehicle occupant of the vehicle is not equal to or lower than the criterion by the first estimator in accordance with the reaction of the vehicle occupant.

7. The vehicle control system according to claim 1, further comprising a state detector configured to detect a state of the vehicle occupant of the vehicle, wherein the first estimator is configured to estimate reduction of the degree of wakefulness on a basis of a result of detection acquired by the state detector.

8. The vehicle control system according to claim 1, wherein the output controller is configured to select a content associated with the degree of wakefulness from among contents requiring a plurality of vehicle occupants of the vehicle engage in active behaviors on a basis of the degree of wakefulness of the vehicle occupant of the vehicle that is estimated by the first estimator and cause the outputter to output the selected content.

9. The vehicle control system according to claim 1, wherein the output controller is configured to select the first content in accordance with a configuration of vehicle components of the vehicle and cause the outputter to output the selected first content.

10. The vehicle control system according to claim 1, further comprising an inputter configured to accept an input operation of the vehicle occupant of the vehicle, wherein the first content is set in accordance with the input operation for the inputter among a plurality of contents.

11. A vehicle control method using an in-vehicle computer, the vehicle control method comprising:
estimating a degree of wakefulness of a driver of a vehicle when automated driving is executed by an automated driving controller that is configured to execute the automated driving to automatedly control at least one of speed control and steering control of the vehicle and estimating the degree of wakefulness of the vehicle occupants in the vehicle;
estimating a number of vehicle occupants in the vehicle and excluding occupants of the vehicle having a lower or equal degree of wakefulness than threshold;
selecting a first content requiring the driver of the vehicle to engage in active behavior based on the number of vehicle occupants;
causing an outputter to output the first content selected requiring the driver of the vehicle to engage in active behavior in a case in which the degree of wakefulness of the driver is estimated as being equal to or lower than a criterion;
selecting the first content requiring the driver of the vehicle engage in the active behavior based on a wakeful number of occupants having a higher degree of wakefulness than the threshold; and
causing the outputter to output the first content selected in a case in which the degree of wakefulness of the driver is estimated as being equal to or lower than the criterion by the first estimator when the automated driving is executed.

12. A non-transitory computer-readable storage medium that stores executable instructions that, when executed by a processor of a system, facilitate performance of operations, comprising:
estimating a degree of wakefulness of a driver of a vehicle when automated driving is executed by an automated driving controller that is configured to execute the automated driving to automatedly control at least one of speed control and steering control of the vehicle and estimating the degree of wakefulness of the vehicle occupants in the vehicle;
estimating a number of vehicle occupants in the vehicle and excluding occupants of the vehicle having a lower or equal degree of wakefulness than threshold;
selecting a first content requiring the driver of the vehicle to engage in active behavior based on the number of vehicle occupants;
causing an outputter to output the first content selected requiring the driver of the vehicle to engage in active behavior in a case in which the degree of wakefulness of the driver is estimated as being equal to or lower than a criterion;
selecting the first content requiring the driver of the vehicle engage in the active behavior based on a wakeful number of occupants having a higher degree of wakefulness than the threshold; and
causing the outputter to output the first content selected in a case in which the degree of wakefulness of the driver is estimated as being equal to or lower than the criterion by the first estimator when the automated driving is executed.

13. The vehicle control system according to claim 1, wherein the first estimator is further configured to estimate the degree of wakefulness of the vehicle occupants in the vehicle, wherein the second estimator is further configured to estimate an attribute of the vehicle occupants, and wherein the output controller is further configured to:
- select the first content requiring the driver of the vehicle engage in the active behavior based on the number of occupants and the attribute, and
- cause the outputter to output the first content selected in a case in which the degree of wakefulness of the driver is estimated as being equal to or lower than the criterion by the first estimator when the automated driving is executed.

* * * * *